H. BAILEY.

Dumping-Wagon.

No. 8,804. Reissued July 15, 1879.

WITNESSES.

P. F. Dwight

L. R. Gaitt.

INVENTOR.

Hamilton Bailey per R. D. Williams,

ATTORNEY.

N. PETERS, PHOTO-LITHOGRAPHER, WASHINGTON, D. C.

UNITED STATES PATENT OFFICE.

HAMILTON BAILEY, OF HARRISBURG, PENNSYLVANIA.

IMPROVEMENT IN DUMPING-WAGONS.

Specification forming part of Letters Patent No. 209,745, dated November 12, 1878; Reissue No. 8,804, dated July 15, 1879; application filed February 4, 1879.

*To all whom it may concern:*

Be it known that I, HAMILTON BAILEY, of Harrisburg, Dauphin county, State of Pennsylvania, have invented certain new and useful Improvements in Dumping-Vehicles; and I hereby declare the same to be fully, clearly, and exactly described as follows, reference being had to the accompanying drawings, in which—

Figure 1:
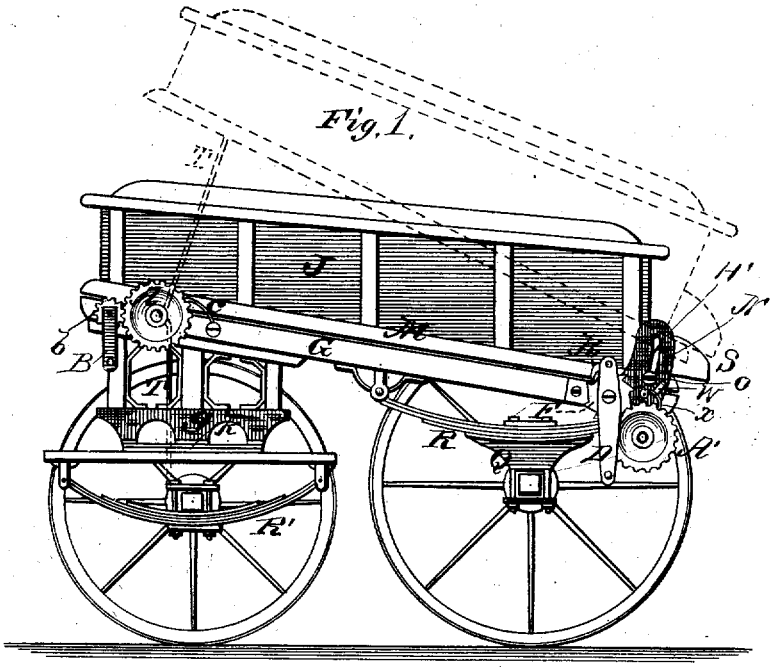
Figure 2:
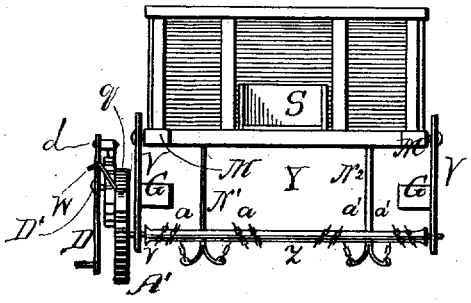
Figure 3:
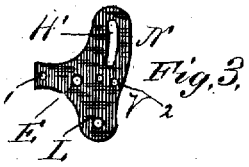

Figure 1 is a side elevation of my improved vehicle, the near wheels being removed. Fig. 2 is a rear elevation of the vehicle-bed, showing the mechanism used for elevating the same. Fig. 3 is a side elevation of one of the slotted plates at the rear end of the carriers.

My present invention is an improvement upon that for which Letters Patent were granted me November 27, 1877, numbered 197,447. I employ the devices described in said patent for elevating the front end of the wagon-bed, and also, by preference, the system of chutes arranged under the wagon-bed, as therein set forth, although other forms of chute may be used.

The object of my present improvement is to admit of the wagon-body being raised vertically upon its bed in order to attain a proper elevation of the same for the discharge of coal through the chute into cellar-openings.

To this end my invention consists, broadly, in adapting to the vehicle-bed mechanism whereby both ends of the same may be raised vertically, or either end independently of the other, and specifically in the peculiar mechanism used, as hereinafter set forth.

I mount my dumping vehicle-bed J on truck rails or carriers G G, which are supported in any approved manner upon a spring-vehicle or vehicle without springs, as preferred, the springs R and R′ being applicable on or below the wagon axle-trees in the usual manner.

The front end of the wagon-bed is elevated by means of the hoisting device shown at A *b* B C T, being that described and claimed in my Letters Patent No. 197,447, hereinbefore mentioned.

The rear end of the wagon-bed J, instead of being, as in said Patent 197,447, so hinged or pivoted to the truck-rails G or supporting-frame as to uniformly maintain its position relatively thereto, is adjustably connected to said truck-rails through slotted plates V, within which plates it has a determined range of vertical elevation, so that it, as well as the front end of the wagon-bed, may be raised, as desired, for the purpose of discharging the contents of the wagon, the following construction being one that I find well adapted for the connection and elevation.

A slotted hinge-plate, V, is secured to the rear end of each of the truck-rails G, each of said plates being made with a bearing, L, for shaft Z, by which wheel A′ is supported, with holes 1 2, through which it is bolted to the outside of rail G, at its rear end, with slot H, described with radius equal to length of rail G, through which, by stud O on bed-timber M, the bed may be hinged thereto at various elevations, according to adjustment of the parts hereinafter described. Said plates serve as guides to prevent lateral displacement on the rails G G, and also hold the bed to place thereon longitudinally.

The hinged props $N^1$ $N^2$ are attached to the under side of wagon-bed aside from the middle thereof, to afford a space, Y, between them for the attachment and operation of chutes, which are usually carried on guides under the middle of said bed. Said props $N^1$ $N^2$ are connected at their forked pendulous ends with shaft Z by chains *a a a′ a′*, which are wound upon the shaft when the bed is hoisted, as shown in Fig. 2, said shaft being revolved by wheel A′, which is driven by pinion Q on ratchet-wheel F, and the latter is rotated by lever D, pivoted to the stud which supports said wheel F, which the lever engages by means of the pawl K, loosely pivoted thereto. A pawl, X, holds wheel A′ when lever D is not engaged, or is being vibrated back to take a rear step on the ratchet. After the bed J has been elevated, and it is desired to let it down, lever D is turned back without engaging its pawl K, and thus pawl X is disengaged by said lever-handle lifting the hook W, which is an extension of pawl X. The bed will then descend by its own gravity, unwinding the chains *a a a′ a′* from shaft Z.

When the wagon-bed is elevated in front and rear, as shown in dotted lines in Fig. 1, it is evident coal may be readily discharged therefrom by gravity, and a chute of any approved make may be attached or applied thereto to convey coal into a cellar-opening across a sidewalk.

I am aware that it is not new to elevate a wagon-bed at both ends, as such has been heretofore accomplished as an incident to a backward movement of the wagon-bed with reference to the truck. This backward movement is wholly unnecessary, and in many instances—as when tree-boxes, lamp-posts, fire-plugs, or awning-posts are in front of the coal-hole—becomes positively detrimental, if not defeating entirely the end desired—namely, that of dumping the coal directly into the cellar.

With the device hereinbefore described, a sufficient elevation is readily attained for the automatic delivery of the coal across the widest sidewalks, while annoyance from the obstacles mentioned cannot possibly occur by reason of the narrowness of the chutes.

In cases where the coal-hole is near the curb, the feature of independent elevation of the ends of the wagon-bed is of importance, it then being only necessary to lift the front end.

In a word, the wagon described embodies all the advantags of the three principal forms of dumping-wagon—viz., the shifting and tilting bed, the shifting and lifting bed, and the simple tilting bed—without the disadvantages attending them in respect to insufficient elevation or motion of the wagon-bed over the sidewalk.

Having thus fully and clearly described my invention, what I regard as new and useful, and what I desire to secure by Letters Patent of the United States, is embraced substantially in the following claims:

1. A dumping-wagon provided with mechanism, as set forth, for lifting the wagon-bed vertically at both ends, substantially as and for the purpose described.

2. A dumping-wagon provided with mechanism, as described, for lifting the wagon-bed at both ends, either end being adapted to be lifted independently of the other, as set forth.

3. In combination with the wagon-bed provided with mechanism, as described, for elevating it at both ends, the slotted guide-plates V, substantially as set forth.

4. The slotted standards V V, constructed substantially as set forth, in combination with the parts G G, or their equivalents, and the vehicle-bed J, provided with the shifting hinge-bearings O O, all connectedly operating substantially as and for the purpose set forth.

5. The bed J of vehicle, connected adjustably with the parts G G thereof by the shifting hinge-joints, composed of the standards V and bearings O, in combination with the hoist apparatus proper, composed of the props $N^1$ $N^2$, reel Z, and the chains *a a a′ a′*, all connectedly arranged for operation substantially as set forth.

6. The combination of the standards V V, wheel A, lever D, wheel F, pawls K X W, and props $N^1$ $N^2$, connected by the chains *a a a′ a′*, with shaft or reel Z, and operating to adjust bed J, in the manner as and for the purpose set forth.

In testimony that I claim the foregoing as my invention I have hereunto set my hand this 3d day of February, 1879.

HAMILTON BAILEY.

Witnesses:

J. SNOWDEN BELL,
GEO. A. VAILLANT.